May 7, 1968 N. L. WILLIAMS 3,381,966

RECORD CHANGER

Filed March 17, 1966 2 Sheets-Sheet 1

Inventor:
Norman L. Williams
By Hofgren, Wegner,
Allen, Stellman & McCord
Attys 3,381,966
RECORD CHANGER
Norman L. Williams, Villa Park, Ill., assignor to Warwick Electronics, Inc., a corporation of Delaware
Filed Mar. 17, 1966, Ser. No. 535,070
6 Claims. (Cl. 274—10)

ABSTRACT OF THE DISCLOSURE

A record changer for automatically playing records of different size, and including a pressure arm that is mounted on a motor board for movement between a first position adjacent a central spindle for stabilizing a stack of records on the spindle, and a second position at the side of the turntable to facilitate the positioning of a record over the spindle. The record changer includes a shut off mechanism that is actuated in response to the pressure arm holding a size sensing member against movement, and the pressure arm includes means for holding the size sensing member against movement in both the first and second positions of the pressure arm, so that a shut off cycle will be initiated either when the last record in a record stack has been played, or when a single record has been played.

This invention relates in general to record changers; and more particularly to automatic record changers for sequentially playing each of the records in a record stack and having means for manual operation of the record changer, whereby a single record can be played with automatic shut-off of the record changer after playing of this record.

This invention is an improvement of the record changer disclosed and claimed in copending application Ser. No. 402,462 of Reed et al., filed Oct. 8, 1964, and assigned to the assignee of the present invention. In the Reed et al. application, many novel features are disclosed, including a unique arrangement for shutting off the record changer after the last record in a stack of records has been played. This last record shut-off means is operatively responsive to the positioning of a selector cam that is carried by a size-sensing member positionable under the record stack, and movable by an ejected record to a position corresponding to the size of the record. The pressure arm of the above mentioned application includes means for sensing the ejection of the last record in a record stack, and this sensing means functions to lock the size selector member in a position which locates the selector cam in a last record shut-off position. The sensing of the ejection of the last record in a record stack by the pressure arm takes place with the pressure arm in an operative position disposed adjacent the spindle of the record changer. Accordingly, if it is desired to play a single record with the above described apparatus, and have the apparatus shut-off after the playing of the record is completed; it is necessary to either place the record on the spindle shelf and move the operating lever to "reject" position, or to thread the record over the spindle shelf onto the turntable and move the operating lever to "on" position. If either of these procedures is followed, it is necessary, of course, to have the pressure arm in the operative position adjacent the spindle to effect a last record shut-off cycle, when the playing of the record is completed. It is highly objectionable when playing only a single record to have to continuously move the pressure arm into and out of a position adjacent the spindle when placing the record on the record changer and removing the record therefrom. Accordingly, the general purpose of the present invention is to provide an automatic record changer with means whereby a single record can be played and the record changer shut-off with the pressure arm in an out of the way position adjacent the side of the turntable.

An object of the invention is to provide a record changer having a pressure arm which is movable between first and second positions, said pressure arm being operative in the first position to actuate last record shut-off means when the last record in a stack of records has been played, and said pressure arm being operative in said second position to actuate last record shut-off means when a single manually loaded record has been played.

Another object of the invention is to provide a record changer as set forth in the preceding paragraph with a size sensing member for controlling actuation of the last record shut-off means, with the pressure arm being operative in said second position to locate the size-sensing member in position for actuating the last record shut-off means.

A further object of the invention is to provide a simple and economical means whereby the pressure arm of an automatic record changer can actuate a last record shut-off cycle, while being disposed in an out of the way position adjacent the side of a turntable.

These and other objects of the invention will hereafter become more fully apparent of the following description, taken in connection with the annexed drawings, wherein.

Figures 1, 2:
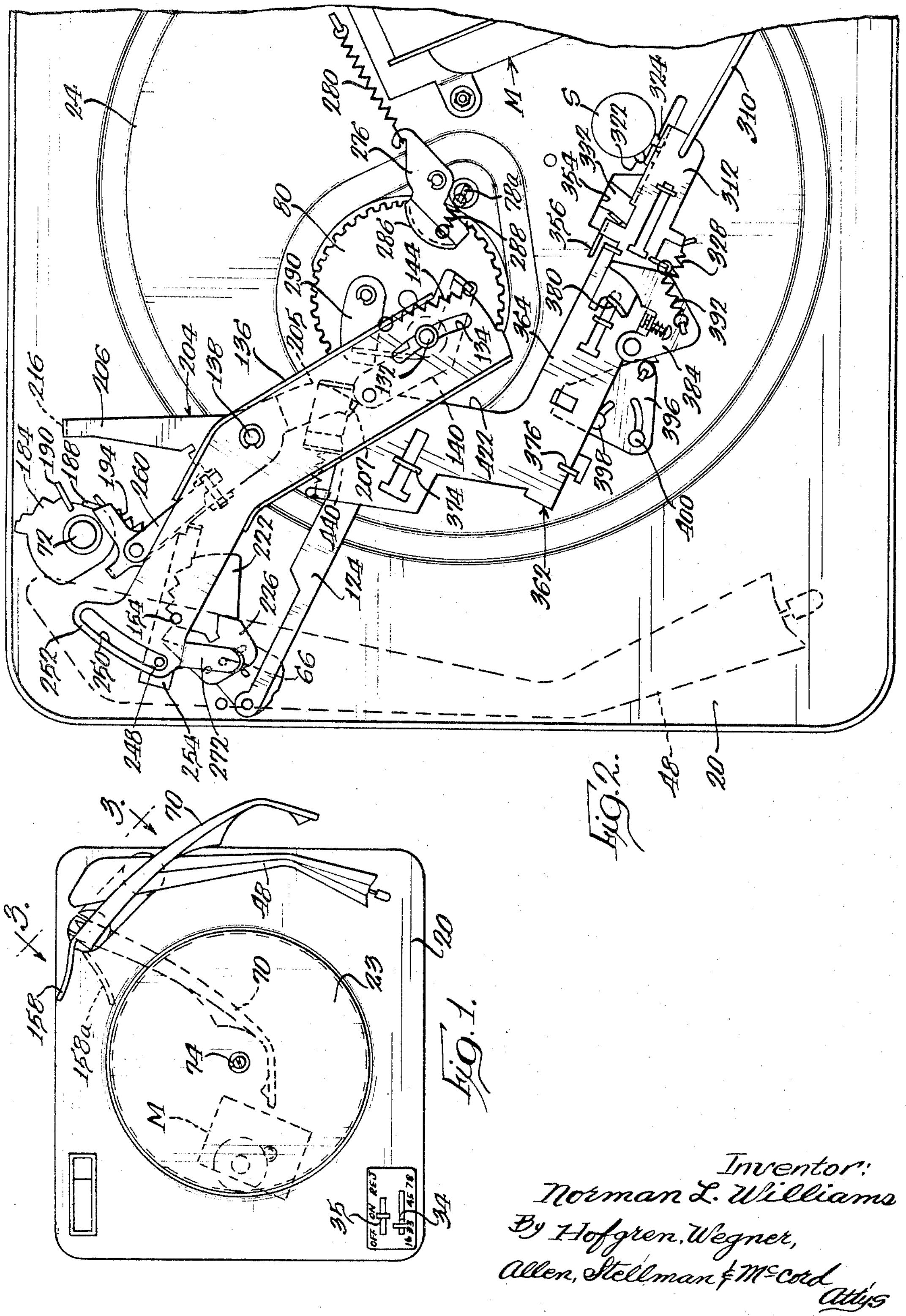
FIG. 1 is plan view of a record changer embodying the principles of the present invention.
FIG. 2 is an enlarged, fragmentary plan view of the bottom of the record changer structure illustrated in FIG. 1.
Figure 3:
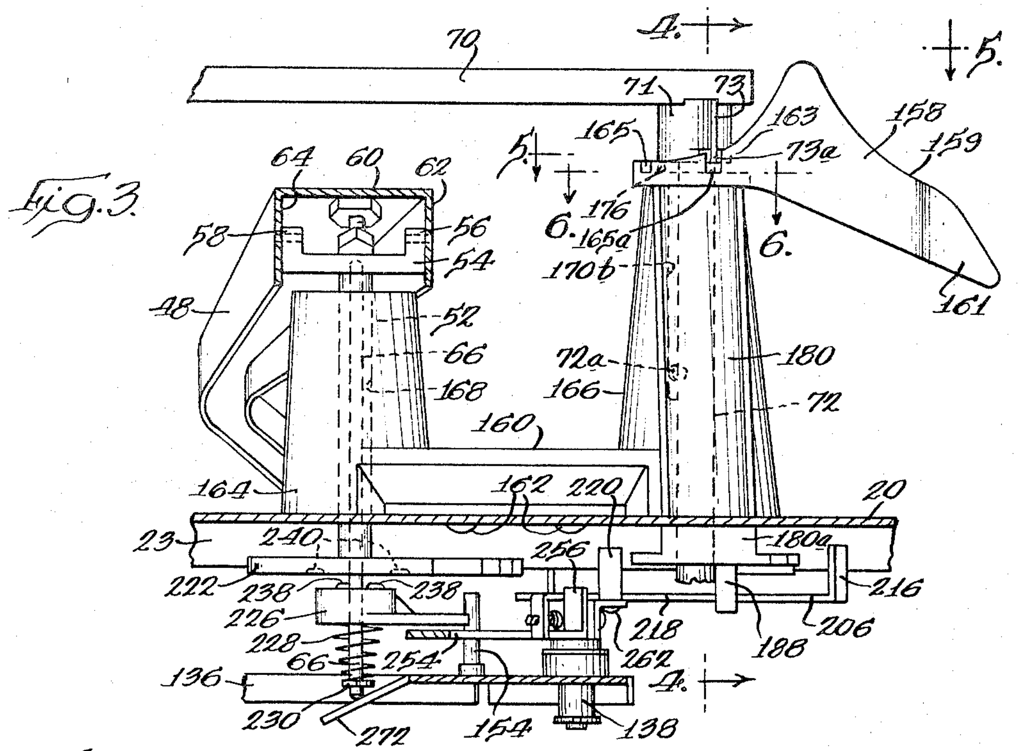
FIG. 3 is an enlarged sectional view taken generally along line 3—3 of FIG. 1.
Figure 4:
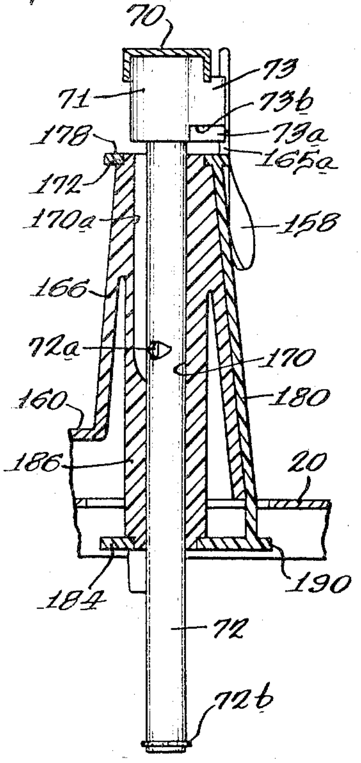
FIG. 4 is a sectional view taken generally along line 4—4 of FIG. 3.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Referring now to the drawings, wherein like reference characters designate like or corresponding parts throughout the several views, since the present invention is an improvement on the record changer disclosed in above mentioned application, Ser. No. 402,462, the same reference numerals have been utilized herein to indicate corresponding parts to facilitate cross referencing between the two applications. The illustrated record changer embodiment includes a generally rectangular motor board 20 having a central well 24, in which a turntable 22 is rotatably mounted. Turntable 22 includes a depending annular flange 23 at the periphery thereof, which is adapted to be drivingly engaged by means rotated by motor M, as is well known in the art. The record changer further includes a tone arm 48, which is provided with a conventional cartridge and stylus assembly for tracking the spiral groove of a record. A vertically extending tone arm shaft 52 is mounted for pivotal movement on motor board 20, and the details of tone arm 48 and its mode of securement to shaft 52 are set forth in detail in the above mentioned copending application.

A pressure arm 70 is provided with a hub 73 fixed to the upper end of a generally vertically extending pressure arm shaft 72, which is also mounted for pivotal movement with respect to motor board 20; and pressure arm 70 is adapted to overlie a stack of records to stabilize the same on a record changer spindle 74 during automatic operation of the record changer, as is shown in broken lines in FIG. 1. The spindle 74 is also fixed on motor board 20, and extends upwardly generally centrally of turntable 22. Turntable 22 is mounted for rotation relative to spindle 74 by a bushing, not shown. As is described in copending application, Ser. No. 402,462, spindle 74 is provided with a shelf spaced above the turntable 22 for supporting a stack of records, and a movable ejector lever is provided within spindle 74 for ejecting the lowermost record in the record stack during a record change cycle.

The record change cycle is effected by movement of the tone arm 48 along the relatively widely spaced groove portion adjacent the center of the record being played, which causes a lever 124 to move toward the spindle with accelerated motion to actuate a velocity trip mechanism for rotating a cycle gear 80. An eccentric drive pin 132 on cycle gear 80 pivots a rocker arm 136 mounted on motor board 20 by pivot pin 36 to thereby; actuate mechanism for moving the tone arm 48 to an out of the way position at the side of the turntable shown in full lines in FIG. 1, position a size sensing member 158 under the records stack, eject the lowermost record in the record stack from the spindle shelf, and move the tone arm 48 inwardly over the ejected record and set the same down in a proper position. The mechanism for accomplishing this is, of course, described in detail in the above mentioned patent application.

As is also explained in the above mentioned patent application, means are provided for manually rejecting the lowermost record in the record stack, and this is accomplished by moving a manually operable lever 35 to a "reject" position (FIG. 1). This in turn moves lever 312 to close motor energizing switch S, and to move the cam surface 422 on L-shaped reject lever 362 into engagement with the aforementioned velocity trip mechanism to cause a record reject cycle for rejecting the lowermost record in the record stack.

Figure 6:
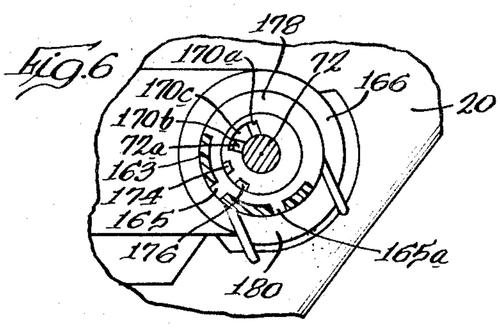
FIG. 6 is a sectional view taken generally along line 6—6 of FIG. 3.

Although the record size-sensing means and the means for shutting off the record changer after the last record in a stack of records has been played during an automatic operation are described in detail in the above mentioned application, their description will be substantially repeated herein, because of their relation to the subject matter of the present invention. Housing means are provided for supporting selector lever 158 and for supporting tone arm shaft 52 and pressure arm shaft 72. The housing means includes a central web portion 160 fixed to the motor board 20 as by screws 162. A pair of upright sleeves 164 and 166 are provided at opposite ends of web portion 160. Uprights 164 and 166 are provided with respective central bores 168 and 170 which mount tone arm shaft 52 and pressure arm shaft 72 for pivotal movement relative to the motor board. A detent member 72*a* is fixedly mounted in pressure arm shaft 72, as by peening over the outer ends thereof; and detent member 72*a* is slideable in a first vertical grove 170*a* in the housing bore 170 to mount the pressure arm for vertical movement relative to the housing means. A snap ring 72*b* is provided at the lower end of shaft 72 to prevent the shaft from being removed from the housing means. As is seen in FIG. 6, groove 170*a* is relatively narrow, and extends downwardly from a recessed portion 170*c* at the upper end of the upright 166 outwardly of bore 170. Detent 72*a* is confined by the side walls of groove 170*a* to prevent rotation of the pressure arm 70, and groove 170*a* is positioned to locate the pressure arm 70 in a first position adjacent the spindle 74, shown in broken lines in FIG. 1. Sufficient clearance is provided between the detent member 72*a* and the walls of groove 170*a* to allow the pressure arm shaft 72 to be moved vertically upwardly until snap ring 72*b* engages the lower portion of housing 166 to position the detent member 72*a* within the recess 170*c*, whereupon the pressure arm 70 may be moved to an out of the way position at the side of the turntable, shown in full lines in FIG. 1.

A second axially extending groove 170*b*, is provided in bore 170, and groove 170*b* extends downwardly from recess portion 170*c* at a point circumferentially spaced from groove 170*a*. Detent 72*a* is slidably receivable in groove 170*b* to locate the pressure arm 70 in the full line position in FIG. 1.

Figure 5:
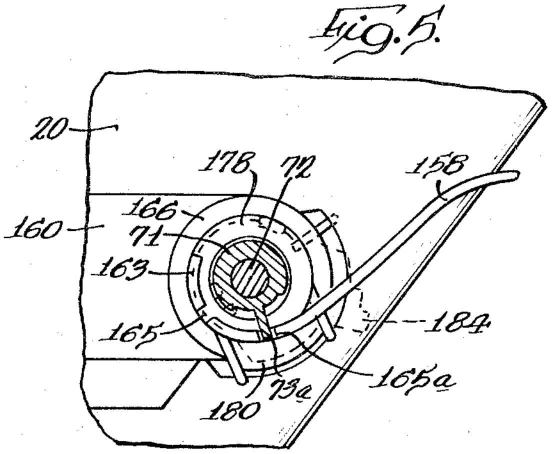
FIG. 5 is a sectional view taken generally along line 5—5 of FIG. 3.

Sleeves 164 and 166 are each generally frustroconically shaped, and the upper surface of upright 166 is provided with a peripheral portion of reduced height 172. A pair of spaced upright lugs 174 and 176 (FIG. 6) are provided on the upper surface of upright 166 radially inwardly of portion 172 and define therebetween an upwardly open notch. As can be best seen in FIG. 5, selector lever 158 is substantially J-shaped in plan view, with the rearmost hooked portion 163 of the lever being substantially concentric with the axis of upright 166. Hooked portion 163 rises upwardly from an annular ring 178 seated withtin the reduced portion 172 of the upright 166. A first slot 165 is provided in hooked flange 163, and is movable into alignment with the slot formed between lugs 174 and 176 to be engaged by a blade abutment 73a formed at the bottom of recess 73 in the pressure arm mounting hub 71. When the blade 73*a* is received in groove 165, the selector member 158 is locked in the full line position shown at 158 in FIG. 1, and is prevented from moving to the broken line position shown at 158*a* in FIG. 1 under the record stack. As is explained in the above mentioned patent application, selector member 158 moves to the position shown at 158 during each record change cycle, and when the last record has been ejected from a record stack, the pressure arms 70 drops downwardly to position the blade 73*a* in groove 165 and lock the selector arm in the position shown at 158. After the stylus assembly of the tone arm 48 has tracked across the spiral groove of the last record, and the actuating member 124 has engaged the trip mechanism to rotate the cycle gear 80, the end portion 216 of a leg 206 on a setdown lever 204 moves into engagement with a radial arm 190 on the selector cam 184, as the setdown lever 204 pivots in a counterclockwise direction (FIG. 2) about the shaft 138. This positions a downwardly extending finger 207 on the rearwardly extending arm portion 205 of the setdown lever 204 in engagement with an upwardly extending flange on a shut-off pawl 440. The details of construction of pawl 440 and finger 207 are set forth in the above mentioned patent application, and it will be sufficient for purposes of the present invention to note that finger 207 moves to the right hand side of pawl 440, as viewed in FIG. 2, so that as gear 80 continues to rotate, and lever 204 pivots in a clockwise direction, finger 207 pulls reject lever 362 to the left as viewed in FIG. 2, which in turn moves lever 312 to the left to open switch S.

A second slot 165*a* is provided in hooked flange 163, and is circumferentially spaced from slot 165 by a distance corresponding to the circumferential spacing of grooves 170*a* and 170*b*. Thus, when it is desirable to manually place a single record on the turntable 20, and have the record changer shut-off after playing of the record is completed, the pressure arm 70 is lifted and pivoted to position the detent member 72*a* in alignment with groove 170*b*, and the pressure arm 170 is lowered to position the blade 73*a* thereon in the second groove 165*a* in the selector arm 158, which in turn positions the pressure arm in full line position of FIG. 1. The position of selector arm 158 and therefore selector cam 184 will be the same as the position corresponding to the blade 73*a* being received in notch 165 so that the radial arm 190 on the selector cam 184 will be engaged by the end portion 216 of the leg 206 on setdown lever 204 as the setdown lever 204 pivots in a counterclockwise direction about shaft 138 during the record change cycle, which takes place after the playing of the record has been completed as noted above in connection with shut-off of the record changer during an automatic sequence. The finger 207 on setdown lever 204 will be positioned to the right of reject lever 362, so that upon clockwise rotation of lever 204, the reject lever 362 and the lever 312 will be moved to the left, as viewed in FIG. 2 to engage switch S and interrupt the circuit to the turntable motor M.

From the foregoing it is believed apparent that the present invention provides a definite improvement over the record changer structure disclosed in copending application Ser. No. 402,462. The improvement enables a single record to be threaded onto and removed from the record changer spindle without having to move the pressure arm, and the pressure arm is located in an out of the way position adjacent the side of the turntable which is effective to initiate a last record shut-off cycle when the single record has been played. Thus, it is believed apparent that each of the objects of the invention have been fully achieved.

I claim:

1. A record changer comprising, in combination: a motor board; a turntable rotatably mounted on said motor board; means for rotating said turntable; a spindle supported on said motor board and extending upwardly generally centrally of said turntable, said spindle being adapted to support a stack of records thereon above said motor board; a tone arm movably mounted on said motor board and having means thereon for tracking a record groove; a pressure arm mounted on said motor board for movement between a first position overlying said stack, and a second position at the side of said turntable to facilitate the positioning and removal of a single record over said spindle onto said turntable; means for sensing the size of a record ejected from said record stack; means, responsive to said pressure arm being in said second position, for inhibiting operation of said size sensing means; and means, responsive to the inhibiting of the operation of said size sensing means, for stopping rotation of said turntable when said tone arm means finishes the tracking of a record groove.

2. The combination of claim 1 in which said size sensing means includes a record size sensing member mounted on said motor board and movable between a first position under said stack for engagement by an ejected record and a second position to one side of the turntable, and wherein said means for inhibiting operation of said size sensing means includes means on said pressure arm for retaining said size sensing member in said second position for actuating the means for stopping rotation of the turntable after playing of a single record.

3. The combination of claim 2 wherein said size sensing member includes first and second spaced notches and said pressure arm includes an abutment positionable in said first and second notches for retaining said size sensing member in second position.

4. The combination of claim 3 including a housing mounted on said motor board and having a bore therein, a shaft received in said bore and having said pressure arm secured to the upper end thereof, a first groove in the wall of said bore corresponding to the first position of said pressure arm, a second groove in the wall of said bore corresponding to the second position of said pressure arm, and a detent on said shaft slideably receivable in said grooves for retaining the pressure arm in the selected position.

5. The combination of claim 4 wherein the first and second notches in said pressure arm are spaced an angular amount corresponding to the spacing of the first and second grooves in said bore wall.

6. A record changer comprising, in combination: a motor board; a turntable rotatably mounted on said motor board; means for rotating said turntable; a spindle supported on said motor board and extending upwardly generally centrally of said turntable, said spindle being adapted to support a stack of records thereon above said motor board; a housing mounted on said motor board and having first and second vertical bores, first and second circumferentially spaced vertical grooves in the wall of said first bore, a recess in said housing at the upper end of said first bore and extending between said first and second grooves; a tone arm having a vertically disposed shaft pivotally mounted in said second bore, said tone arm having means thereon for tracking a record groove; a size sensing member pivotally mounted on said housing, and having first and second spaced notches, said size sensing member being movable between a first position under said stack for engagement by an ejected record, and a second position to one side of the turntable; a pressure arm having a vertically disposed shaft mounted in said first bore for movement of said pressure arm between a first position overlying said stack, and a second position at the side of said turntable to facilitate the positioning and removal of a single record over said spindle onto said turntable, said pressure arm shaft having a detent thereon slideably receivable in said first and second grooves, so that said pressure arm can be moved vertically to position said detent in said recess whereby said pressure arm can be pivoted relative to said housing, said first groove being located so as to position said pressure arm in said first position when said detent is received therein, and said second groove being located so as to position said pressure arm in said second position when said detent is received therein; means for stopping rotation of said turntable when said tone arm means finishes the tracking of a record groove; an abutment on said pressure arm positionable in said size sensing member first and second notches to retain said size sensing member in said second; and means responsive to said size sensing member being retained in said second position for actuating the means for stopping rotation of the turntable.

References Cited

UNITED STATES PATENTS

| | | | |
|---|---|---|---|
| 2,637,558 | 5/1953 | Fisher | 274—10 |
| 2,738,193 | 3/1956 | Rae | 274—10 |

HARRY N. HAROIAN, *Primary Examiner.*